United States Patent [19]

Park et al.

[11] 4,378,448

[45] Mar. 29, 1983

[54] POLYAMIDE GRAFT AS HOT-MELT ADHESIVE, AND ELASTOMER BLEND

[75] Inventors: George B. Park; John M. Senior, both of Purton, Nr. Swindon, England

[73] Assignee: Raychem Corporation, Menlo Park, Calif.

[21] Appl. No.: 192,341

[22] Filed: Sep. 29, 1980

[30] Foreign Application Priority Data

Oct. 20, 1979 [GB] United Kingdom ............... 7936505

[51] Int. Cl.$^3$ .......................... C08F 2/54; C08J 3/28; C08F 283/04
[52] U.S. Cl. ................................ 525/63; 204/159.15; 525/92; 525/426
[58] Field of Search .................... 204/159.15; 525/63, 525/92, 426

[56] References Cited

U.S. PATENT DOCUMENTS

| | | | |
|---|---|---|---|
| 2,027,962 | 3/1933 | Currie | 18/55 |
| 2,518,148 | 8/1950 | Jordan et al. | 525/426 |
| 2,824,848 | 2/1958 | Wittcoff | 525/426 |
| 2,956,899 | 10/1960 | Cline | 204/159.15 |
| 3,008,920 | 11/1961 | Vrchick | 204/159.15 |
| 3,010,782 | 11/1961 | McCaleb et al. | 21/2.7 |
| 3,026,292 | 3/1962 | Stanton et al. | 204/159.15 |
| 3,061,581 | 10/1962 | Rowland et al. | 525/426 |
| 3,068,122 | 12/1962 | Cline et al. | 204/159.15 |
| 3,078,544 | 2/1963 | Shealy | 204/159.15 |
| 3,086,242 | 4/1963 | Cook et al. | 18/1 |
| 3,088,791 | 5/1963 | Cline et al. | 204/159.15 |
| 3,265,765 | 8/1966 | Holden et al. | 260/876 |
| 3,281,383 | 10/1966 | Zelinski et al. | 260/23.7 |
| 3,334,153 | 8/1967 | Fukushima et al. | 525/63 |
| 3,338,985 | 8/1967 | Magat et al. | 260/830 |
| 3,424,820 | 1/1969 | Magat et al. | 260/857 |
| 3,471,386 | 10/1969 | D'Alelio | 204/159.15 |
| 3,736,281 | 5/1973 | Russell | 525/92 |
| 3,787,531 | 1/1974 | Dahlquist et al. | 525/92 |
| 3,792,002 | 2/1974 | Krieger et al. | 260/18 N |
| 3,796,771 | 3/1974 | Owens et al. | 526/63 |
| 4,018,733 | 4/1977 | Lopez et al. | 260/27 EV |
| 4,278,777 | 7/1981 | Jakabhazy et al. | 204/159.15 |

FOREIGN PATENT DOCUMENTS

| | | |
|---|---|---|
| 290457 | 3/1966 | Australia . |
| 2809769 | 9/1978 | Fed. Rep. of Germany . |
| 862768 | 3/1961 | United Kingdom . |
| 872514 | 7/1961 | United Kingdom . |
| 893904 | 4/1962 | United Kingdom . |
| 899567 | 6/1962 | United Kingdom . |
| 901039 | 7/1962 | United Kingdom . |
| 901042 | 7/1962 | United Kingdom . |
| 941667 | 11/1963 | United Kingdom . |
| 1076336 | 7/1967 | United Kingdom . |
| 1100968 | 1/1968 | United Kingdom . |
| 1107524 | 3/1968 | United Kingdom . |
| 1122138 | 7/1968 | United Kingdom . |
| 1139437 | 1/1969 | United Kingdom . |
| 1174462 | 12/1969 | United Kingdom . |
| 1216230 | 12/1970 | United Kingdom . |
| 1244746 | 9/1971 | United Kingdom . |
| 1302619 | 1/1973 | United Kingdom . |
| 1352809 | 5/1974 | United Kingdom . |
| 1428553 | 3/1976 | United Kingdom . |

OTHER PUBLICATIONS

J. Polymer Sci. (1969) 26 37.
Adhesives Age, Aug. 1978, by R. Hinterwaldner.

*Primary Examiner*—John C. Bleutge
*Assistant Examiner*—A. H. Koeckert
*Attorney, Agent, or Firm*—Edith A. Rice; Herbert G. Burkard

[57] ABSTRACT

A polyamide suitable as a hot-melt adhesive contains pendent graft copolymerized chains derived from aromatic compounds having an olefinically unsaturated moiety, e.g., styrene, lower methacrylates, epoxy-containing unsaturated compounds, acrylonitrile or methacrylonitrile, but contains no free graft comonomer.

The polyamides show improved peel strengths, especially at low and high temperatures. The low temperature properties may be further improved by incorporating an elastomer, preferably a thermoplastic elastomer, part of which is compatible with the graft copolymerized chains.

27 Claims, No Drawings

POLYAMIDE GRAFT AS HOT-MELT ADHESIVE, AND ELASTOMER BLEND

This invention relates to adhesives, and especially to hot-melt adhesives that are based on polyamides.

The use of hot-melt adhesives for bonding a variety of materials is well known. Due to the properties of these adhesives and their ease of application to substrates, they have been widely used for bonding materials such as synthetic polymer to substrates including the same or different polymers, and metals. One problem encountered with hot-melt adhesives, however, is that they become brittle at low temperatures, and so suffer from reduced sealing ability. Also, their brittleness can cause the adhesive to crack at low temperatures because of relative movement between the substrates, for example due to thermal contraction or mechanical vibration.

The present invention provides a polyamide suitable for use as a hot-melt adhesive, the polyamide containing pendant graft copolymerised chains derived from one or more aromatic compounds having at least one olefinically unsaturated moiety, one or more lower methacrylates, one or more epoxy-containing olefinically unsaturated compounds, acrylonitrile or methacrylonitrile and containing substantially no free graft comonomer.

By "lower methacrylates" there is meant organic esters of methacrylic acid having an O-organic group that contains not more than 11 carbon atoms. Preferably the lower methacrylate is an alkyl methacrylate having an alkyl group which may be linear, branched or cyclic, but is preferably linear, and more preferably having an alkyl group of from 4 to 8 carbon atoms. Preferred methacrylates include methyl methacrylate, ethyl methacrylate, n-butyl methacrylate, isobutyl methacrylate, cyclohexyl methacrylate and 2-ethylhexyl methacrylate. Where the alkyl group has fewer than seven carbon atoms it is usually desirable, although not essential, to graft copolymerise only one alkyl methacrylate, that is, to form homopolymerised graft chains, while if the alkyl methacrylate has seven or more carbon atoms, especially if it has at least nine carbon atoms in its alkyl group, it may be advantageous to employ an alkyl methacrylate having fewer than six carbon atoms in its alkyl group, e.g. methyl methacrylate or ethyl methacrylate, as an additional graft comonomer.

Of the aromatic compounds, those having a monocyclic aromatic moiety which may be homo- or heterocyclic may be mentioned, especially those having a phenyl or pyridyl ring. The preferred compounds are vinyl pyridines, styrene, or analogues thereof having one or more alkyl substituents (which may be on the aryl or olefinic moiety). Preferably the vinyl pyridines or styrene are unsubstituted or substituted by one or more alkyl groups having from 1 to 4 carbon atoms, preferably methyl groups, and more preferably, if they are substituted, have only one methyl substituent. The most preferred compounds are styrene, α-methyl styrene and vinyl pyridines.

Epoxy-containing olefinically unsaturated compounds may also be employed as graft comonomers, preferably glycidyl acrylates and/or methacrylates. It is of note that, where these compounds are used as graft comonomers, bonds to the copolyamide may be formed either by opening of the acrylate or methacrylate double bond or by opening of the epoxy ring.

According to another aspect, the invention provides a polyamide suitable for use as a hot-melt adhesive, the polyamide containing pendant graft copolymerised chains derived from styrene and/or one or more substituted styrenes, one or more lower methacrylates, glycidyl acrylate or methacrylate, acrylonitrile or methacrylonitrile, and containing substantially no free graft comonomer.

Of particular note are n-butyl methacrylate and styrene, especially when used as the sole graft comonomer.

Ungrafted polyamides, that is polyamides before any pendant chains have been grafted thereto, which are suitable for use as hot-melt adhesives and which may therefore be used to form the polyamides according to the present invention are generally characterised by the fact that they are formed from dicarboxylic acids and poly-primary or secondary amines, preferably diamines, in which the carboxylic acid groups of the dicarboxylic acids or the nitrogen atoms of the amines or both are separated by an average of at least fifteen carbon atoms. Such polyamides generally have amorphous structures in contrast with the more highly crystalline, fibre forming polyamides such as nylon 6.6 or nylon 6. A number of suitable polyamides are described in U.S. Patent Specification Nos. 1,100,968, 1,107,524, 1,122,138, 1,216,230, 1,352,809, 1,139,437, U.S. Pat. No. 3,792,002, German Specification No. 2,809,769 and Australian Specification No. 290,457, the disclosures of which are incorporated herein by reference.

In general, any dicarboxylic acid in which the carboxylic acid groups are separated by a bivalent hydrocarbon group which may be saturated or unsaturated, aliphatic, aromatic or cycloaliphatic or which may have two or more aliphatic, aromatic or cycloaliphatic moieties, can be used to form the polyamides. Where long chain diamines are used, that is diamines having chains of at least fifteen carbon atoms separating the nitrogen atoms, dicarboxylic acids such as adipic, sebacic, suberic, succinic, glutaric, isophthalic, terephthalic and phthalic acids may be, and preferably are, used. Of the dicarboxylic acids, dimeric fatty acids are preferred. The term "dimeric fatty acid" is intended to include any acid obtained by dimerising saturated, ethylenically unsaturated or acetylenically unsaturated naturally occurring or synthetic monobasic aliphatic carboxylic acids containing from 8 to 24 carbon atoms. Such dimeric fatty acids are fully described in U.S. Pat. No. 4,018,733, the disclosure of which is incorporated herein by reference.

In the diamines that may be used in the preparation of the ungrafted polyamide, the nitrogen atoms are separated by a hydrocarbon group which may be aliphatic, cycloaliphatic or aromatic or may have a combination of any two or more aliphatic, cycloaliphatic or aromatic moieties, and, in addition, it may contain ether linkages such as in the diamines prepared from diphenyl ether. Examples of such diamines include straight chain or branched alkylene diamines, having from 2 to 40 carbon atoms in the alkylene group, e.g. ethylene diamine, 1,3-diaminopropane, hexamethylene diamine, 9-aminomethylstearylamine and 10-aminoethylstearylamine; 1,3-di-4-piperidyl propane, diaminodicyclohexylmethane; methylene dianiline and bis(aminoethyl)diphenyl oxide. Dimeric fat diamines and "ether diamines" may also be used. These diamines are also described in U.S. Pat. No. 4,018,733 mentioned above, and U.S. Pat. No. 3,010,782, the disclosure of which is incorporated herein by reference.

Diamines having fewer than 15 carbon atoms can usually only be used in the preparation of the ungrafted copolyamides when the dicarboxylic acid has at least 15 carbon atoms separating the carboxylic acid groups or when the diamines are used together with longer chain polyamines. Such short chain diamines include ethylene diamine, 1,3-diaminopropane, 1,3-diaminobutane, tetramethylene diamine and decamethylene diamine.

Monoalkanolamines as described in the above U.S. Pat. No. 4,018,733, may also be employed as starting materials in conjunction with polyamines. In addition, small quantities of other compounds commonly used in the preparation of such polyamides may also be used, for example cyclic lactams such as $\epsilon$-caprolactam, and $\omega$-aminocarboxylic acids.

The polyamides are preferably formed by condensing the dicarboxylic acids with excess polyamine sufficient to form a polyamide having an amine number of at least 5 (measured in accordance with ASTM D 2074-66).

As will be appreciated, the ungrafted polyamides are chosen so that they will have physical properties that make them suitable for use as adhesives. For example they will advantageously have an elongation at break of greater than 400%, at 20° C., a ring and ball softening point in the range of from 90° to 150° C. and a glass transition temperature less than or equal to 0° C.

Additional components may advantageously be incorporated with the polyamides, for example hardeners, fillers, extenders, fortifiers, carriers and stabilizers in known manner.

It is an essential requirement that the grafted polyamide according to the invention contains substantially no free graft comonomer, that is, that the polyamide contains not more than 0.2%, preferably not more than 0.1% and especially not more than 0.05% by weight of any residual free graft comonomer since this will adversely affect the adhesion of the grafted copolyamide to a substrate. The preferred polyamides will contain less than 0.01% residual free graft comonomer by weight, this being the detectable limit of the comonomer using currently used techniques.

It is preferable that the copolyamide be free from substantial quantities of any ungrafted polymer derived from the graft comonomer, since substantial quantities of such ungrafted polymers can reduce the adhesion of the polyamide to certain materials. In general it is preferred that any quantity of ungrafted polymer derived from the graft that is present is insufficient to form a separate phase from that of the polyamide.

The polyamides according to the invention may be produced by forming free radical sites in an ungrafted polyamide that is suitable for use as a hot-melt adhesive, allowing one or more of the graft comonomers specified above to polymerise on the free radical sites, and, if necessary, then removing unreacted graft comonomer from the polyamide. The free radical sites may be formed by irradiating the polyamide, for example with ultraviolet radiation, high energy electrons or gamma radiation, or by means of chemical initiators, e.g. peroxides. Whichever method is used, it may be desirable to employ polymerisation auxiliaries to aid the graft polymerisation reaction and/or certain polymerisation inhibitors to inhibit the formation of ungrafted polymeric products. Advantageously the polymerisation is initiated by means of high energy electrons, e.g. from an electron accelerator, or gamma radiation, in which case the polyamide preferably receives a dose of not more than 10 Mrad, expecially from 4 to 6 Mrad. Doses significantly in excess of 10 Mrad may cause some of the properties of the polyamide such as its tensile strength or elongation to be adversely affected. The ungrafted polyamide may be irradiated prior to being contacted with the graft comonomer, the irradiation being conducted in the presence of oxygen or air or in an inert gas, or the polyamide may be irradiated in the presence of the graft comonomer.

In one process, the polyamide is irradiated in an inert atmosphere, usually in nitrogen, thereby forming free radicals on the polyamide polymer chains. The irradiated material is then immersed in the graft comonomer for up to 20 hours during which time the graft comonomer is absorbed in the polyamide and is grafted onto the free radical sites. After immersion the material is washed free of monomer using large quantities of solvent, e.g. acetone, and/or it is allowed to dry in a current of warm air. In view of the fact that the free radicals formed on irradiation have a limited lifetime (a half life in the order of ten hours) it is desirable to immerse the irradiated material in the graft comonomer without excessive delay after irradiation, preferably less than 20 hours and especially less than 10 hours after irradiation, otherwise, in order to graft a significant quantity of comonomer onto the polyamide, a dose of greater than 10 Mrads will be needed. It is believed that this process leads almost entirely to the formation of grafted polymer and to the formation only of small quantities of free polymer derived from the graft comonoer, especially if conducted at room temperature so that thermal initiation of polymerisation reactions is reduced.

In another process, the polyamide material is irradiated in the presence of air leading to the formation of peroxidized and hydroperoxidized polymer. The irradiated material is then immersed in bulk graft comonomer, or a solution thereof at elevated temperature so that thermal decomposition of the peroxides and hydroperoxides formed on irradiation will initiate the formation of graft copolymer chains. For example the irradiated material may be refluxed in a solution of graft comonomer (e.g. in toluene) for 3 hours. Excess free graft comonomer may be removed by reprecipitation. Although it is thought that this process may lead to the formation of some ungrafted polymer by thermal initiation or by thermal decomposition of the hydroperoxides (the hydroperoxides leading to equivalent quantities of grafted polymer and free polymer), any free polymer formed may be removed together with the unreacted graft comonomer in the washing step. This process has the advantage that, due to the formation of peroxides and hydroperoxides which are more stable than the free radicals formed on irradiation, the irradiated polyamide material may be left for some time before treatment with the graft comonomer.

A further process for the preparation of the graft polyamides comprises irradiating the ungrafted polyamide material in the presence of the graft comonomer, the graft comonomer beng present as a liquid or vapour or in solution. The irradiated material is then washed and dried as described above. While this process has the advantage that the free radicals formed on the polyamide polymer chains are utilized rapidly and efficiently, a quantity of free polymer derived from the graft comonomer is formed, probably due to irradiation of the free monomer. This is pronounced where the graft comonomer is present in excess.

The graft polyamides may also be formed by solution or emulsion polymerisation processes using chemical initiators. Any form of initiator may be used provided that the free radicals formed are capable of promoting polymerisation of the graft copolymer. For example peroxides or azo compounds may be used for solution polymerisation while redox initiators may be used for emulsion or suspension polymerisation. In a preferred process, the ungrafted polyamide is refluxed in a 0.2 to 0.5 M solution of graft comonomer in either chlorobenzene or toluene and in the presence of benzoyl peroxide at a concentration of about $3 \times 10^{-3}$ M based on the total volume of monomer and solvent. After refluxing for several hours the product is reprecipitated by mixing the hot solution in acetone, and the reprecipitated product is washed and dried as described above.

Preferably, the polyamides have a grafted chain content of not more than 10%, especially in the range of 1 to 5% by weight based on the total weight of the grafted copolyamide. The content of grafted chains can be measured by infra-red or $^1$H n.m.r. spectroscopy or by nitrogen analysis of the copolyamide before and after grafting according to standard techniques. Where styrene or substituted styrenes are used as the graft comonomer, the content of grafted chains may be ascertained using the Hilton method (Rubber Age, August 1959 pp. 782-785). The conditions of the grafting reaction (temperature, graft comonomer concentration etc.) and the duration of immersion in the graft comonomer required to form a product having the preferred grafted chain content can easily be determined for any initial radiation doses by analysis of the product.

It is possible, by varying the choice of initial ungrafted polyamides or graft comonomers or by varying the conditions of the irradiation or graft reaction, to vary the properties of the resulting grafted product. Thus, in certain cases it is possible to form grafted polyamides having a significantly higher melting or softening point than that of the initial polyamide, thereby increaseing the possible temperature range over which the polyamides may be used as hot-melt adhesives. As an example of this, when styrene is grafted onto Versalon 1300 (trademark), a polyamide of a dimer acid, dimer diamine and ethylene diamine, the start of softening of the polyamide is increased from about 50° C. to over 70° C. (for grafted chain contents of 3% and over). Also, in many cases, it is possible for the adhesion of the grafted copolyamide to certain substrates, for example polyethylene, to be improved considerably, sometimes exhibiting peel strengths of up to, or even more than, two and one half times that of the ungrafted copolyamide.

According to a preferred aspect of the invention, there is provided an adhesive composition which comprises a polyamide according to the invention and an elastomer, at least part of which is compatible with the pendant graft copolymerised chains.

Preferably the elastomer is a thermoplastic elastomer, and especially one which comprises a linear or radial A-B-A block copolymer. These thermoplastic elastomers usually have end blocks or A blocks formed from a hard polymer, that is, formed from a polymer having a glass transition temperature above room temperature, and one or more intermediate or B blocks formed from an elastomeric polymer with a glass transition temperature below room temperature. At normal temperatures the end blocks agglomerate, due to their incompatibility with the elastomeric polymer, to form domains in which the end blocks are held together by physical forces and/or hydrogen bonding, while the intermediate blocks form elastomeric domains or an elastomeric matrix. Advantageously the block copolymers comprise at least 50%, and preferably from 60 to 90% elastomeric blocks, in which case, according to one model (Holden, Bishop and Legge, J. Polym. Sci. 1969, 26, 37), the end-block domains act as a reinforcing filler and provide thermally labile crosslinks, thereby allowing the block copolymers to be processed by conventional thermoplastic techniques and to be recycled without deterioration of their physical properties.

The end-blocks of the A-B-A block copolymer are preferably formed from polystyrene or a substituted styrene polymer, e.g. poly α-methylstyrene, and especially from polystyrene. The intermediate blocks may be formed from amorphous, substituted or unsubstituted hydrocarbon homo- or copolymers. Thermoplastic elastomers which may be used in the compositions are described in U.S. Pat. Nos. 3,265,765, 3,281,383 and 3,787,531, the disclosures of which are incorporated herein by reference.

The polyamide and the elastomer may be blended in any convenient manner to form the composition, for example in a 2 roll mill, a Z-blade mixer or in the screw of an extruder, the blending being performed at an elevated temperature or at room temperature.

It has been found that it is possible to form adhesive compositions of the polyamides with the elastomers that have improved elastomeric properties at low temperatures as compared with the polyamide adhesives from which they are formed, usually with no significant loss of room temperature adhesion.

There is no absolute limit to the quantity of elastomer that may be present in the composition. Compositions containing up to 100%, and especially up to 25% of elastomer by weight, based on the weight of the grafted polyamide are preferred. The polyamides and polyamide/elastomer compositions according to the present invention may be used in many applications where an adhesive is to be applied to an article that is likely to be exposed to low temperatures and especially a polymeric article, for example, an article formed from a polyolefin. Accordingly, the present invention also provides an article, especially an article comprising a polyolefin, at least part of which has been coated with a grafted polyamide according to the invention or a composition containing such a grafted polyamide.

The polyamides and compositions are particularly suitable for use with dimensionally heat-recoverable articles. Heat-recoverable articles are articles having a dimensional configuration that may be made substantially to change when subjected to heat treatment. Heat-recoverable articles may be produced by deforming a dimensionally heat-stable configuration to a heat-unstable configuration, in which case the article tends to assume the original heat-stable configuration on the application of heat alone. An example of such an article is found in U.S. Pat. Nos. 2,027,962 and 3,086,242, the disclosures of which are incorporated herein by reference.

The following Examples illustrate the invention.

EXAMPLE 1

A number of samples of a polyamide hot-melt adhesive, Versalon (trademark) 1300 based on dimer acids, dimer diamines and ethylene diamine, were irradiated in a 6 MeV electron beam with a range of doses and in a nitrogen atmosphere. After irradiation the adhesive was immersed in liquid graft comonomer for 20 hours and then washed with large quantities of acetone and dried in a current of warm air. The content of grafted chains in the resulting adhesive (% graft content) was calculated from measurement of the initial and final nitrogen content.

Plaques of the grafted adhesive having a thickness of 1 mm were formed at a temperature of 110° C. and a force of 20 tons. Joints were then prepared by pressing 25 mm squares of the adhesives between two pieces of a polyethylene substrate, each being 25 mm×75 mm in size. The surfaces of the substrate were abraded and degreased prior to preparation of the joints and the joints were pressed at 150° C. for 20 minutes in an oven using a pre-heated jig and 5 lbs weight. The resultant T-peel joints were pulled on a Hounsfield Tensometer in accordance with ASTM D1876 speed 50 mm/min.

The joints were tested using three substrates, namely: Alkathene (trademark) 77/11, a low density polyethylene; Carlona (trademark) 30-002BA, a low density polyethylene; Manolene (trademark) 5203, a medium to high density polyethylene. The results are given in tables I and II.

TABLE I

| | Graft Comonomer = n-Butyl Methacrylate | | | |
|---|---|---|---|---|
| Dose | % Graft | Peel Strength (N/25mm) | | |
| (Mrads) | Content | Manolene | Carlona | Alkathene |
| 0.5 | 3.5 | 190 | 160 | 140 |
| 2.5 | 5.0 | 210 | 110 | 150 |
| Ungrafted V1300 | | 82 | 96 | 76 |

TABLE II

| | Graft Comonomer = Styrene | | | |
|---|---|---|---|---|
| Dose | % Graft | Peel Strength (N/25mm) | | |
| (Mrads) | Content | Manolene | Carlona | Alkathene |
| 2.5 | 5.5 | 160 | 210 | 220 |
| Ungrafted V1300 | | 82 | 96 | 76 |

EXAMPLE 2

Versalon 1300 was irradiated by high energy electrons in air to 3, 5 or 10 Mrads and then reacted by refluxing in a solution of styrene in toluene for about 3 hours. The grafted products were reprecipitated, filtered, washed and dried. Plaques were pressed and peel strengths determined using Manolene and Carlona in T-peel mode.

The results are shown in Table III.

TABLE III

| | | Peel Strength (N/25mm) | |
|---|---|---|---|
| Dose | % Styrene | Manolene | Carlona |
| 3 | 2.4 | 230 | 140 |
| 5 | 4.9 | 220 | 210 |
| 10 | 9.9 | 380 | 300 |
| Ungrafted V1300 | | 82 | 96 |

EXAMPLE 3

Peel strengths were determined over a wide temperature range (−20° C. to +100° C.) for Versalon 1300, Versalon 1300 grafted with 5% styrene prepared according to Example 2 and Versalon 1300 blended with 5% of a tackifier notably Piccolastic A50 and Piccolastic A75 (trademarks) the results being shown in Table IV. Although the blend of Versalon 1300 with 5% Piccolastic A50 shows enhanced peel strength at 20° C., this is not seen at higher or lower temperatures.

TABLE IV

| | Substrate = Manolene 5203 | | | |
|---|---|---|---|---|
| | Peel Strength (N/25mm) | | | |
| Temperature | V1300 | Grafted V1300 | V1300 + A50 | V1300 + A75 |
| −20° C. | 10 | 130 | 40 | 20 |
| 0° C. | 50 | 140 | 110 | 40 |
| +20° C. | 120 | 270 | 220 | 110 |
| +40° C. | 60 | 240 | 190 | 70 |
| +60° C. | 80 | 170 | 70 | 50 |
| +80° C. | 10 | 30 | 10 | 10 |
| +100° C. | 5 | 5 | 0 | 5 |

EXAMPLE 4

Samples of Versalon 1300 copolyamide were irradiated with a dose of about 5 Mrad of 6 MeV electrons and were grafted using α-methylstyrene as graft comonomer according to Example 2 to form a product having a graft copolymer content of from 2 to 5% by weight. Peel strengths using Carlona 30-002BA and Manolene 5203 were determined as in Example 1 and were found to be 170 and 210 N/25 mm respectively.

EXAMPLE 5

A sample of Versalon 1300 copolyamide was grafted with acrylonitrile according to Example 2 to form a product having a graft copolymer content of from 2 to 5% by weight. The peel strength was determined as in Example 1 using Manolene 5203 as substrate and found to be 240 N/25 mm. This example may be repeated using methacrylonitrile as graft comonomer and a similar result obtained.

EXAMPLE 6

Example 2 is repeated using a glycidyl acrylate or methacrylate as the graft comonomer and similar improvements in the T-peel values as compared to the ungrafted copolyamide are observed.

EXAMPLE 7

A polyamide sold by Kommerling GmbH under the trade name SK600 was grafted with styrene according to Example 2 using an electron dose of 5 Mrads. The graft content was measured to be 4% by the Hilton method. The peel strengths at various temperatures were measured as in Example 1 and are given in Table V.

TABLE V

| | Peel Strength (N/25mm) | |
|---|---|---|
| Temperature | Ungrafted SK600 | Grafted SK600 |
| −40° C. | 50 | 190 |
| −20° C. | 40 | 150 |
| 0° C. | 50 | 220 |
| +20° C. | 90 | 310 |
| +40° C. | 60 | 260 |
| +60° C. | 40 | 140 |
| +80° C. | 30 | 50 |

EXAMPLE 8

Samples of a polyamide hot-melt adhesive (Versalon 1300) were grafted with a number of graft comonomers according to one of the methods (1) to (3) below and the peel strengths of the grafted adhesive between two high density polyethylene substrates (Manolene 5203) were measured as described in Example 1. The results are shown in Table VI. Table VI also shows, for comparison, the peel strengths recorded for the individual batches of ungrafted polyamide from which the grafted polyamides were formed.

Methods of preparation of the grafted polyamide:

(1) Irradiation in nitrogen followed by immersion in the graft comonomer and washing as described in Example 1.

(2) Irradiation in air followed by refluxing in the graft comonomer and washing as described in Example 2.

(3) The polyamide was soaked for a period of from 6 to 24 hours in undiluted graft comonomer. The surface was wiped clean to removed excess graft comonomer and the polyamide was then irradiated with 6 MeV electrons to a dose of from 0.5 to 5 Mrads. After irradiation the grafted polyamide was washed as described in Example 1.

TABLE VI

| Graft Comonomer | Method of Preparation | % Graft | Peel Strength N/25mm | Peel Strength of ungrafted polyamide N/25mm |
|---|---|---|---|---|
| Methyl methacrylate | (2) | 4% | 190 | 90 |
| | (1) | 4% | 130 | 100 |
| | (1) | 5% | 180 | 100 |
| butyl methacrylate | (2) | 3% | 90 | 60 |
| | (2) | 6% | 120 | 60 |
| | (3) | 13% | 220 | 100 |
| | (3) | 21% | 140 | 100 |
| isobutyl methacrylate | (3) | 21% | 150* | 100 |
| cyclohexyl methacrylate | (2) | 20% | | |
| 2-ethylhexyl methacrylate | (2) | 3% | 130 | 50 |
| acrylonitrile | (2) | 2% | 240 | 100 |
| | (2) | 1% | 140 | 50 |
| 4-vinyl pyridine | (2) | 15% | 200 | 50 |

*mean of 2 values.

EXAMPLE 9

Samples of Versalon 1300 (trademark) that had been grafted with 2% of styrene graft comonomer according to Example 2 were blended with a thermoplastic elastomer comprising a styrene-butadiene-styrene or a styrene-isoprene-styrene block copolymer sold under the trade names Kraton 1102 and Kraton 1107 respectively. The peel strengths of the blends were determined as in Example 1 and the ultimate elongations of the blends were tested in accordance with ASTM D1708-56 with a crosshead speed of 55 mm/minute. The results are given in Table VII.

TABLE VII

| Polyamide | Thermoplastic elastomer* | Peel strength (N/25mm) | | Ultimate elongation (%) | |
|---|---|---|---|---|---|
| | | −20° C. | +20° C. | −40° C. | −20° C. |
| Grafted Versalon | None | 60 | 110 | 14 | 100 |
| Grafted Versalon | 5% Kraton 1102 | 70 | 140 | 5 | 40 |
| Grafted Versalon | 20% Kraton 1102 | 260 | 230 | 40 | 270 |
| Grafted Versalon | 5% Kraton 1107 | 140 | 140 | 20 | 120 |
| Grafted Versalon | 20% Kraton 1107 | 340 | 140 | 50 | 180 |
| Ungrafted | None | 20 | 50 | 10 | 120 |

TABLE VII-continued

| Polyamide | Thermoplastic elastomer* | Peel strength (N/25mm) | | Ultimate elongation (%) | |
|---|---|---|---|---|---|
| | | −20° C. | +20° C. | −40° C. | −20° C. |
| Versalon | | | | | |

*percentages based on the weight of the grafted polyamide.

EXAMPLE 10

A sample of Versalon 1300 grafted with styrene to give a product having a 2.5% by weight graft content was blended with 20% (based on the weight of the grafted polyamide) of a styrene-ethylene-butylene-styrene thermoplastic elastomer*. The peel strengths and ultimate elongations were determined as in Example 9 at a number of termperatures and are shown in Table VIII.

TABLE VIII

| Composition | Peel Strength (N/25mm) | | | Ultimate elongation (%) | |
|---|---|---|---|---|---|
| | −40° C. | +20° C. | +60° C. | −40° C. | −20° C. |
| grafted Versalon + 20% Kraton G1650 | 30 | 350 | 90 | 40 | 230 |
| Ungrafted Versalon | 10 | 90 | 80 | 10 | 120 |
| Ungrafted Versalon + 20% Kraton G1650 | | | | 10 | 69 |

*sold under the trade name "Kraton G1650".

COMPARATIVE EXAMPLE

Example 8 was repeated with the exception othat the polyamide hot-melt adhesive (Versalon 1300) was grafted with a number of graft comonomers falling outside the scope of those defined in the invention. The peel strengths are shown in Table IX.

TABLE IX

| Graft Comonomer | Method of Preparation | % Graft | Peel Strength N/25mm | Peel strength of ungrafted Polyamide. N/25mm |
|---|---|---|---|---|
| Methyl acrylate | (2) | 3 | 70 | 100 |
| | (1) | 4 | 40 | 90 |
| | (3) | 15 | 70 | 100 |
| Butyl acrylate | (2) | 3 | 40 | 100 |
| Isobutyl acrylate | (1) | 4 | 50 | 90 |
| 2-Ethylhexyl acrylate | (2) | 5 | 90 | 100 |
| Dodecyl methacrylate | (1) | 3 | 80 | 100 |
| | (2) | 10 | 15 | 100 |
| Vinyl acetate | (1) | 4 | 60 | 90 |
| Vinyl stearate | (2) | 2 | 0 | 100 |
| Acrylic acid | (2) | 6 | 0 | 50 |

We claim:

1. A polyamide suitable for use as a hot-melt adhesive, the polyamide being formed from at least one dicarboxylic acid and at least one polyamine, wherein there is an average of at least fifteen carbon atoms separating the acid or the amine groups of at least one of said dicarboxylic acid or said polyamine, respectively, and containing pendent graft copolymerized chains derived from at least one graft comonomer selected from the group consisting of aromatic compounds having at least one olefinically unsaturated moiety, lower methacrylate esters, acrylonitrile and methacrylonitrile, the polyamide containing substantially no free graft comonomer.

2. A polyamide as claimed in claim 1, wherein the graft comonomer is styrene, a vinyl pyridine or an analogue of styrene or a vinyl pyridine having one or more alkyl substituents.

3. A polyamide as claimed in claim 2, wherein the graft comonomer is styrene, α-methyl styrene or a vinyl pyridine.

4. A polyamide as claimed in claim 1, wherein the graft comonomer is an alkyl methacrylate having an alkyl group of from 1 to 11 carbon atoms which may be linear, branched or cyclic.

5. A polyamide as claimed in claim 4, wherein the graft comonomer is methyl methacrylate, ethyl methacrylate, n-butyl methacrylate, isobutyl methacrylate, cyclohexyl methacrylate or 2-ethylhexyl methacrylate.

6. A polyamide suitable for use as a hot-melt adhesive, the polyamide being formed from at least one dicarboxylic acid and at least one polyamine, wherein there is an average of at least fifteen carbon atoms separating the acid or the amine groups of at least one of said dicarboxylic acid or said polyamine, respectively, and containing pendant graft copolymerised chains derived from at least one graft comonomer selected from the group consisting of styrene, substituted styrenes, lower methacrylate esters, acrylonitrile and methacrylonitrile, and containing substantially no free graft comonomer.

7. A polyamide as claimed in any one of claims 1 to 6, which is formed at least partly from one or more dimeric fatty acids and/or one or more dimeric fat diamines.

8. A polyamide as claimed in any one of claims 1 to 6, which contains not more than 0.1% be weight of free graft comonomer.

9. A polyamide as claimed in any one of claims 1 to 6, which does not contain sufficient free polymer derived from the graft comonomer or comonomers to form a separate phase from the grafted polyamide.

10. A polyamide as claimed in any one of claims 1 to 6, which contains up to 10% by weight of graft copolymerised chains based on the total weight of the grafted polyamide.

11. A process for the production of a grafted polyamide which comprises forming free radical sites in an ungrafted polyamide that is suitable for use as a hot-melt adhesive, said polyamide being formed from at least one dicarboxylic acid and at least one polyamine wherein there is an average of at least fifteen carbon atoms separating the acid or the amine groups of at least one of said dicarboxylic acid or said polyamine, respectively, and allowing one or more graft comonomers comprising an aromatic compound having at least one olefinically unsaturated moiety, a lower methacrylate ester, acrylonitrile or methacrylonitrile, to polymerise on the free radical sites, and, if necessary, then removing unreacted graft comonomer from the polyamide.

12. A process as claimed in claim 11, wherein the free radical sites are formed by irradiating the ungrafted polyamide with high energy electrons or gamma radiation.

13. A process as claimed in claim 12, wherein the ungrafted polyamide is irradiated in the presence of oxygen.

14. A process as claimed in claim 13, wherein the graft comonomer is incorporated in the ungrafted polyamide only after the free radical sites have been formed.

15. A process as claimed in any one of claims 12 to 14, wherein the or each graft comonomer is selected from styrene, a substituted styrene, a lower methacrylate ester, acrylonitrile or methacrylonitrile.

16. An adhesive composition which comprises a polyamide as claimed in claim 1 and an elastomer, at least part of which is compatible with the pendant graft copolymerised chains.

17. A composition as claimed in claim 16, wherein the part of the elastomer that is compatible with the graft copolymerised chains is derived from the same monomer or monomers as the graft copolymerised chains.

18. A composition as claimed in claim 16, wherein the elastomer is a thermoplastic elastomer.

19. A composition as claimed in claim 18, wherein the thermoplastic elastomer comprises a linear or radial A-B-A block copolymer.

20. A composition as claimed in claim 19, wherein the thermoplastic elastomer contains polystyrene blocks and the graft copolymerised chains of the polyamide are derived from styrene.

21. A dimensionally heat-recoverable article at least part of which has been coated with a hot-melt adhesive composition comprising a polyamide formed from at least one dicarboxylic acid and at least one polyamine, wherein there is an average of at least fifteen carbon atoms separating the acid or the amine groups of at least one of said dicarboxylic acid or said polyamine, respectively, and containing pendent graft copolymerized chains derived from at least one graft comonomer selected from the group consisting of aromatic compounds having at least one olefinically unsaturated moiety, lower methacrylate esters, acrylonitrile and methacrylonitrile, the polyamide containing substantially no free graft comonomer.

22. An article as claimed in claim 21, wherein the graft comonomer is styrene, a vinyl pyridine or an analogue of styrene or a vinyl pyridine having one or more alkyl substituents.

23. An article as claimed in claim 22, wherein the graft comonomer is styrene, α-methyl styrene or a vinyl pyridine.

24. An article as claimed in claim 21, wherein the graft comonomer is an alkyl methacrylate having an alkyl group of from 1 to 11 carbon atoms which may be linear, branched or cyclic.

25. An article as claimed in claim 24, wherein the graft comonomer is methyl methacrylate, ethyl methacrylate, n-butyl methacrylate, isobutyl methacrylate, cyclohexyl methacrylate or 2-ethylhexyl methacrylate.

26. A dimensionally heat-recoverable article at least part of which has been coated with a hot-melt adhesive composition comprising a polyamide being formed from at least one dicarboxylic acid and at least one polyamine, wherein there is an average of at least fifteen carbon atoms separating the acid or the amine groups of at least one of said dicarboxylic acid or said polyamine, respectively, and containing pendant graft copolymerised chains derived from at least one graft comonomer selected from the group consisting of styrene, substituted styrenes, lower methacrylate esters, acrylonitrile and methacrylonitrile, and containing substantially no free graft comonomer.

27. An article as claimed in claim 21 or 26, which is formed at least partly from one or more dimeric fatty acids and/or one or more dimeric fat diamines.

* * * * *

UNITED STATES PATENT AND TRADEMARK OFFICE
CERTIFICATE OF CORRECTION

PATENT NO. : 4,378,448
DATED : March 29, 1983
INVENTOR(S) : Park et al

It is certified that error appears in the above-identified patent and that said Letters Patent are hereby corrected as shown below:

Column 2, line 22 reads - "U.S. Patent" should read -- U.K. Patent --.

Signed and Sealed this

Twenty-fifth Day of December 1984

[SEAL]

Attest:

GERALD J. MOSSINGHOFF

*Attesting Officer*  *Commissioner of Patents and Trademarks*